United States Patent
Moritz

(10) Patent No.: US 7,263,588 B1
(45) Date of Patent: Aug. 28, 2007

(54) DATA STORAGE SYSTEM USING GEOGRAPHICALLY-DISTRIBUTED STORAGE DEVICES/FACILITIES

(75) Inventor: Elan Moritz, Lynn Haven, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 508 days.

(21) Appl. No.: 10/847,682

(22) Filed: May 17, 2004

(51) Int. Cl.
*G06F 12/14* (2006.01)
*G06F 12/16* (2006.01)

(52) U.S. Cl. .................. 711/161; 707/10; 713/193; 713/200; 711/164

(58) Field of Classification Search ............... 713/193, 713/200; 707/10; 711/161, 164
See application file for complete search history.

(56) References Cited

U.S. PATENT DOCUMENTS 7,200,696 B2 * 4/2007 Basso et al. ............... 710/54

* cited by examiner

*Primary Examiner*—Jack A. Lane
(74) *Attorney, Agent, or Firm*—James T. Shepherd

(57) ABSTRACT

A data storage system has data storage devices dispersed over a geographic area such that any two of the data storage devices are separated by a distance measured in miles or kilometers. A processing system coupled to the data storage devices performs several functions that culminate in the generation of a data package for each data bit of a data file that is to be stored. Each such data package includes a value of the data bit, a bit storage location, identification of the data file with which the data bit is associated, and an ordered-position bit number associated with the data bit. The data processing system distributes data packages associated with a data file approximately evenly amongst the data storage devices for storage thereat.

12 Claims, 3 Drawing Sheets

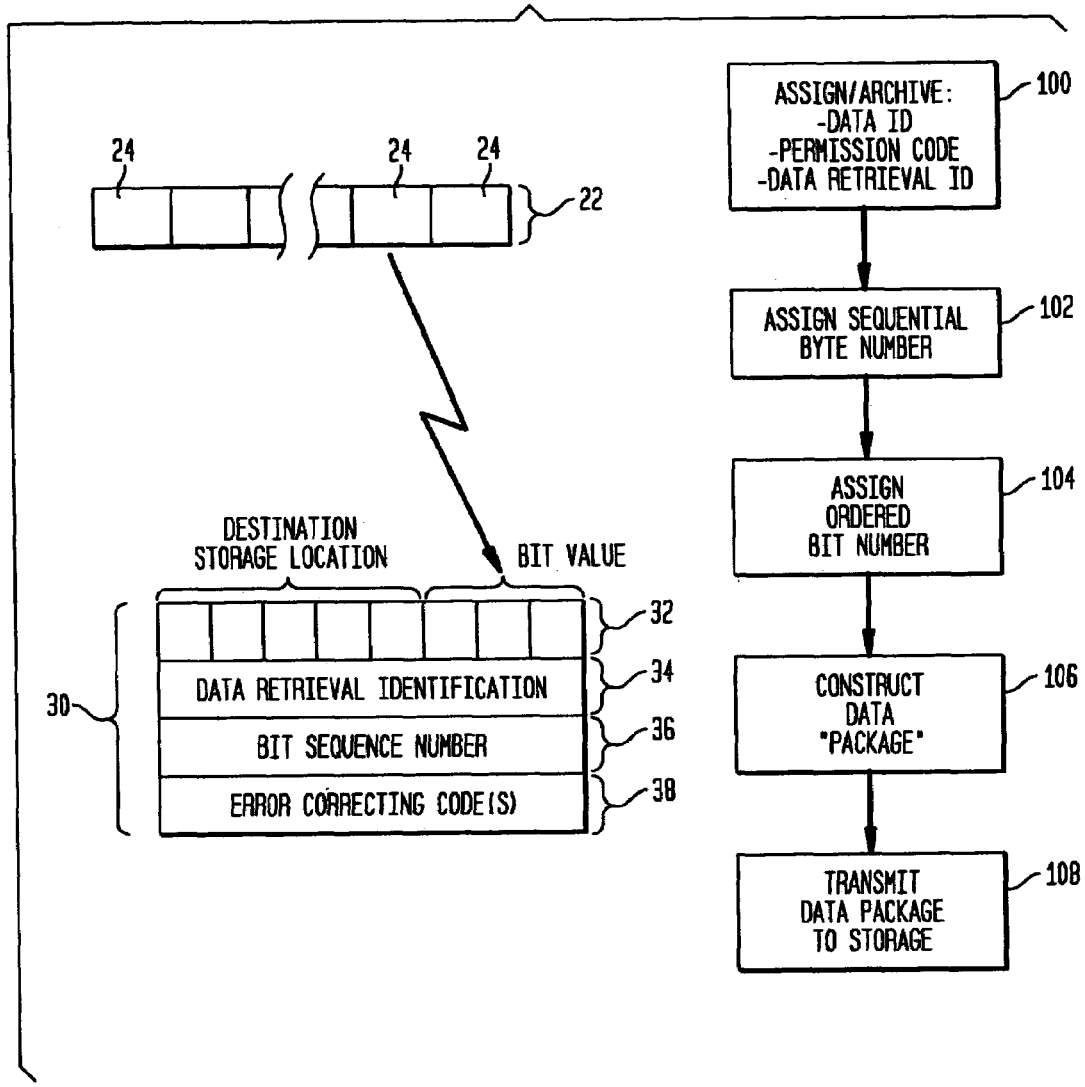

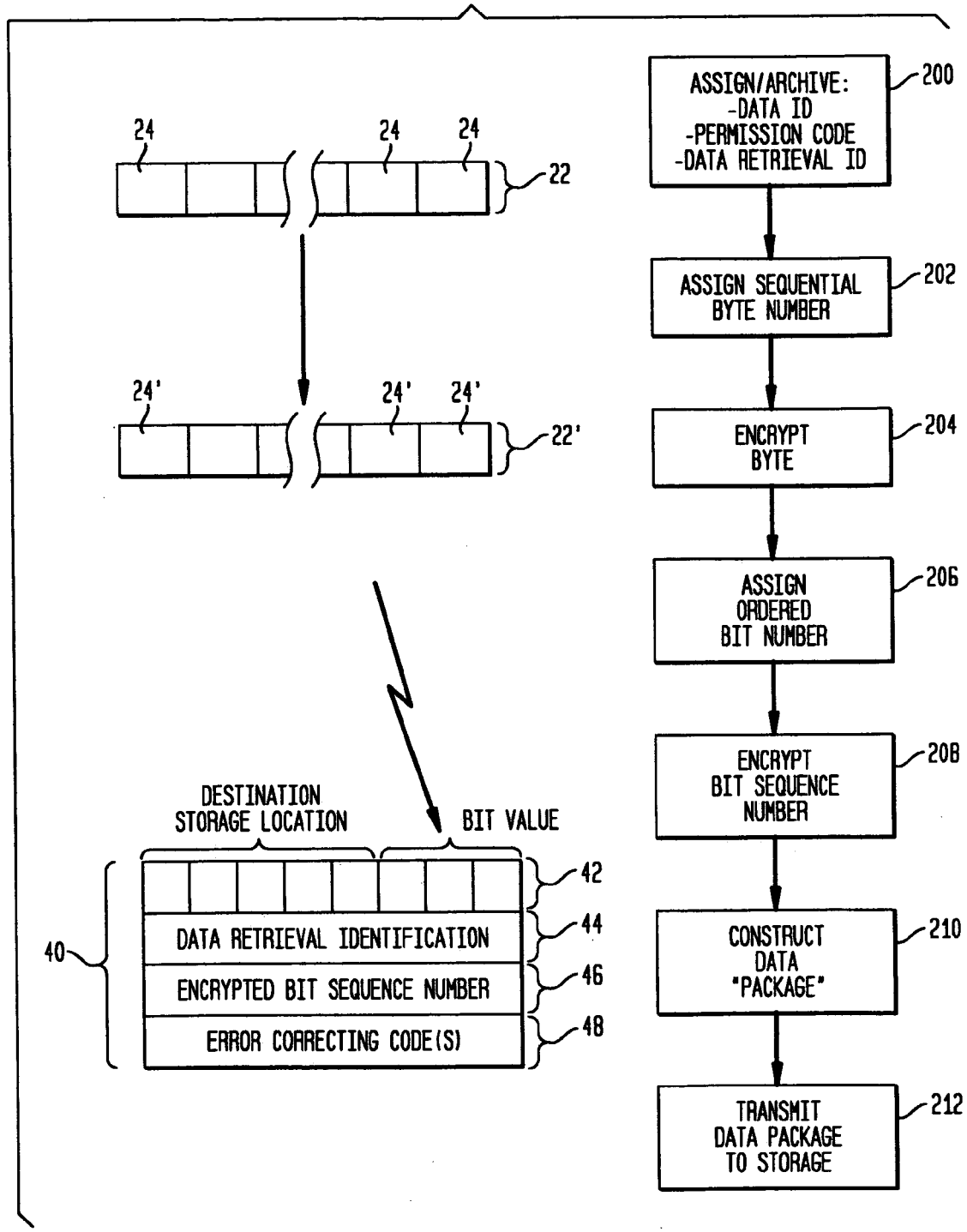

US 7,263,588 B1

DATA STORAGE SYSTEM USING GEOGRAPHICALLY-DISTRIBUTED STORAGE DEVICES/FACILITIES

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "PREPARING DATA FOR STORAGE IN A SECURE FASHION" U.S. patent application Ser. No. 10/834,157, filed Apr. 23, 2004, by the same inventor as this patent application.

FIELD OF THE INVENTION

The invention relates generally to electronic data storage and retrieval systems, and more particularly to a data storage system that can distribute data to and provide for the gathering of data from storage devices/facilities that are dispersed over a relatively large geographic area.

BACKGROUND OF THE INVENTION

Companies, organizations and civilian/military government entities often have electronic data repositories for storage of critical and/or sensitive data. The data repositories can be static storage facilities for archiving data in storage devices, or dynamic storage facilities that provide for the electronic transfer of data into and out of data storage devices. In either case, the data storage devices are typically maintained in a physical location that is secured utilizing one or more conventional "secure facility" systems such as locked rooms/buildings, security checks for personnel having authorized access to the secure facility, alarm systems, etc. However, if access is gained to the secure facility, it is often easy to physically remove or steal the data storage devices maintained in the secure facility. Given the current state-of-the-art in data storage device capacity, it is conceivable that one individual can walk off with large amounts of critical and/or sensitive data in a coat pocket. Once in possession of these data storage devices, the thief can access the secret or confidential data thereon at his leisure using his own processing equipment. Even if the stored confidential data is encrypted for security, most (if not all) encryption routines can be "cracked" given enough time and sufficient computing power.

In addition to physical theft, there has been a proliferation of cyber-crime or hacking perpetrated by unauthorized personnel or criminals. Thus, it is also desirable to increase measures that prevent electronic data access (to include data extraction or copying) by unauthorized individuals. Most methods that protect against unauthorized electronic data extraction/copying rely on combinations of encryption algorithms and/or password protection. Even if the stored confidential data is encrypted for security, most (if not all) encryption routines can be "cracked" given enough time and sufficient computing power. In addition to encryption, the advent of the internet and use of internet protocol (IP) based digital transactions has spawned protection methods that use IP-based authentication (i.e., tracing and evaluation of the originating IP address). However, many "hacking events" have demonstrated the ease with which unauthorized users can penetrate a variety of existing sophisticated data processing and storage protection systems. Indeed, stories of stolen credit card number lists, as well as break-in and manipulation of commercial, industrial and defense data centers, have become almost routine in the news.

Finally, data repositories could be the target of deliberate data destruction events (e.g., terrorists attacking a data center, criminals trying to erase data or blow up a data center containing incriminating evidence, or foreign enemies trying to disrupt U.S. military activities by destroying data repositories). Accordingly, it is desirable to prevent deliberate data destruction attempts. At a minimum, it is desirable to provide systems/methods that complicate data destruction attempts. If such prevention and/or complication efforts are successful, future attempts at data disruption or destruction will be prevented and discouraged as individuals or organizations contemplating such activities would know that their attempts to destroy meaningful data will be doomed to failure.

SUMMARY OF THE INVENTION

Accordingly, it is an object of the present invention to provide a system that stores data in a secure fashion.

Another object of the present invention is to provide a system for breaking up a data file prior to the storage thereof with the data break-up being reversible to facilitate later retrieval and reassembly of the data.

Still another object of the present invention is to provide a system that distributes a data file as small pieces thereof over a wide geographic area to minimize or eliminate the possibility that the entire data file will be destroyed.

Other objects and advantages of the present invention will become more obvious hereinafter in the specification and drawings.

In accordance with the present invention, a data storage system has a plurality of data storage devices dispersed over a geographic area such that any two of the data storage devices are separated by a distance measured in miles or kilometers. A processing system coupled to the data storage devices is adapted to receive data files from data sources and to receive requests for the data files from data retrievers. The processing system assures that each data file consists of data bytes in a digital format. The processing system performs several functions to include assigning a unique bit number to each data bit in the data bytes where the bit number identifies a position of the data bit in the data file. The data processing system generates a data package for each data bit. Each such data package includes a value of the data bit, a bit storage location, identification of the data file with which the data bit is associated, and the bit number associated with the data bit. As a result, a plurality of data packages are generated for the data file. The data processing system distributes data packages associated with a data file approximately evenly amongst the data storage devices for storage thereat.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a graphic depiction of one embodiment of a reformatting process along with a flowchart of the steps thereof; and FIG. 4 is a graphic depiction of another embodiment of a reformatting process that includes a two-key encryption along with a flowchart of the steps thereof.

DETAILED DESCRIPTION OF THE INVENTION

Figure 1:
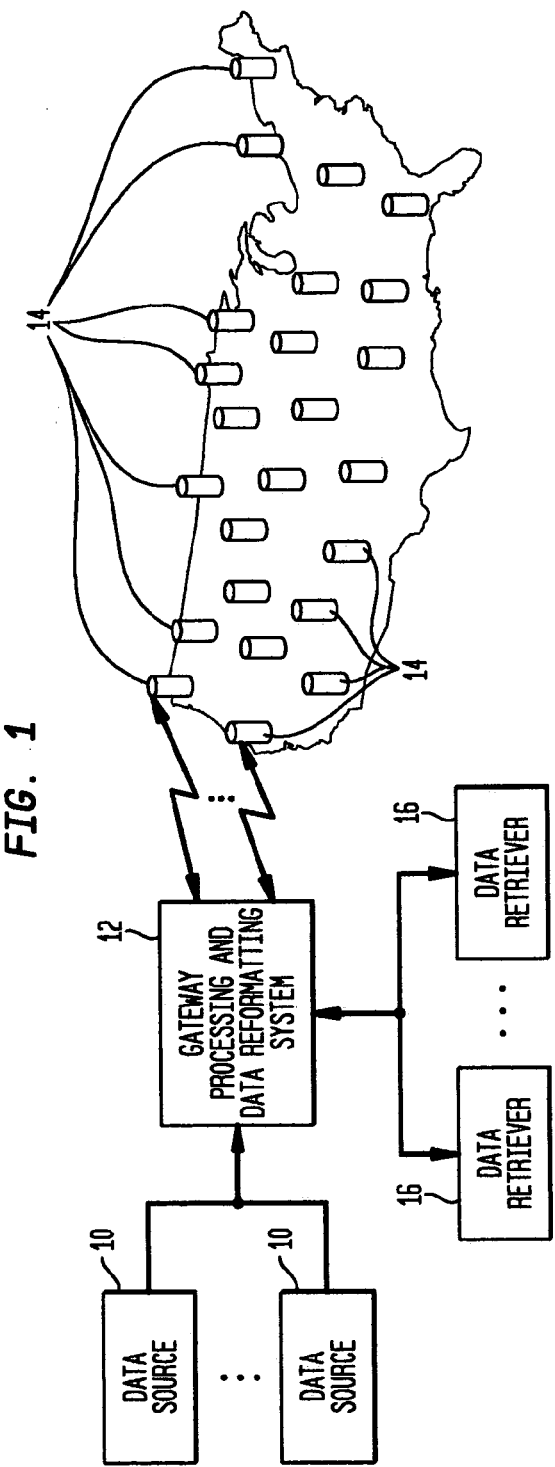
FIG. 1 is a block diagram of an embodiment of a data storage system that uses geographically-distributed storage devices/facilities in accordance with the present invention.

Referring now to the drawings, and more particularly to FIG. 1, a block diagram is shown of an embodiment of a system that reformats data and stores the reformatted data in accordance with the present invention. The reformatting process prepares the data for storage in a secure fashion. The reformatting process also places the data in a format that allows the data to be returned to its original format when an authorized request is made to retrieve the data.

In FIG. 1, one or more data sources 10 send data file(s) to a central gateway processing and data reformatting system 12 (hereinafter referred to as gateway 12) where each such data file is prepared/reformatted and then stored in a secure fashion in accordance with the present invention. Gateway 12 is a data processing system that typically includes data input/output (I/O) interfaces, analog-to-digital data converters, one or more processors, local memory, and any other hardware required to handle data throughput and processing in support of the present invention's system. Such hardware configurations are well known and understood in the art and are not limitations of the present invention.

As will be explained in greater detail below, gateway 12 distributes the reformatted data amongst a plurality of data storage devices/facilities 14 that are geographically dispersed over a wide area (e.g., the United States). For purposes of the present invention, the geographic dispersion is such that the distance between any two storage devices/facilities 14 is measured in miles or kilometers. The reformatting process of the present invention also provides for the efficient reconstruction of the data to its original format at gateway 12 following an authorized retrieval request by a data retriever 16.

Data source 10 represents any entity or device that is the source of raw data or information. The information can be in any form ranging from digital data to an electronic form of a plain-paper, handwritten document. Accordingly, gateway 12 evaluates the nature of the raw data. In the event the source information is not in a digital format, the information can be converted into digital format by any appropriate means (e.g., document scanner, voice digitization into MP3 files, analog-to-digital conversion for analog signals or analog data, etc.) at gateway 12. Such data conversion means and schemes are well understood in the art and, therefore, will not be described further herein.

Figure 2:
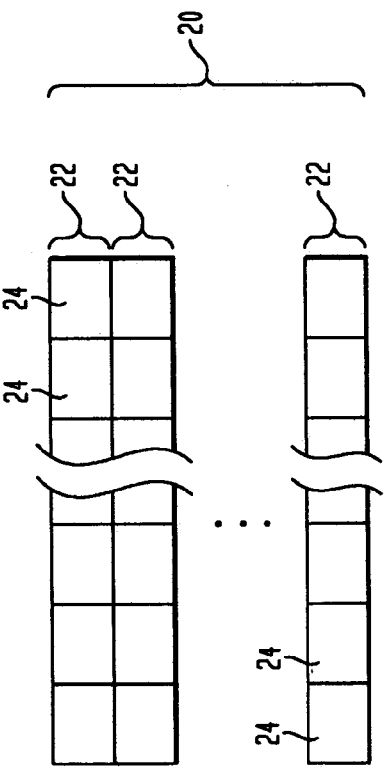
FIG. 2 is a graphic depiction of the bits and bytes of a data file that is to be reformatted by the present invention.

Data reformatting according to the present invention is performed by gateway 12 as will now be described with the aid of FIGS. 2 and 3, which will be referred to simultaneously. FIG. 2 is a graphic depiction of a data file 20 that is to be reformatted. It is assumed that data file 20 is in a digital format with each row 22 of squares being indicative of a data byte, and each square 24 being indicative of a single bit (i.e., a "0" or "1") of data in a data byte 22. FIG. 3 illustrates the reformatting and data storage process graphically and by means of a flowchart.

Each data file 20 will have its own unique identification in the form of, for example, a name, a number, a name and number, etc. The identification can be incorporated into data file 20 or can be generated or assigned by gateway 12. Associated with the data identification is a permission code that can be generated/assigned by gateway 12. At a minimum, the permission code is used to verify that a data retrieval is being made by an authorized user. Finally, a data retrieval identification unique to each data file 20 is generated/assigned by gateway 12. Regardless of their origins, gateway 12 associates and archives each data file's data identification, permission code and data retrieval identification at step 100.

It is assumed that data file 20 has sequentially ordered data bytes 22. On a byte-by-byte basis, gateway 12 assigns each data byte 22 a byte number at step 102 based on the sequential position of data byte 22 in data file 20. For example, the first data byte 22 in data file 20 is assigned byte number 0, the second data byte 22 in data file 20 is assigned byte number 1, etc. Next, at step 104, gateway 12 assigns the individual bits 24 in data byte 22 a bit sequence number based on a unique ordered position of bits 24 in data file 20. For example, if data byte 22 was based on the fourth data byte (i.e., a sequential byte number of 3) of data file 20, the bit sequence number for the fifth bit from the right of (fourth) data byte 22 would be (8×3)+5=29. Note that other methods of assigning a bit sequence number could be used without departing from the scope of the present invention. The main objective is to simply have a counting method that uniquely identifies the location or ordered position of each data bit in data file 20.

Next, at step 106, gateway 12 generates a data "package" 30 for each data bit 24. Each data package 30 contains information in the form of, for example, several bytes of data. In the illustrated example, the first byte 32 of data package 30 contains the value of one data bit 24 and a destination storage location for bit 24. The digital "0" or "1" value of data bit 24 is stored using one or more bits of first byte 32. In the illustrated example, three bits of an 8-bit byte 32 are used to store a digital "0" (i.e., 000) or digital "1" (i.e., 111). Use of multiple bits provides a level of robustness. The remaining bits of first byte 32 contain the destination storage location for first byte 32. The "location" bits identify both the geographic location of one of storage devices/facilities 14 as well as a storage address in a storage device maintained thereat.

Gateway 12 also appends other bytes of data to first byte 32. For example, the previously-described data retrieval identification can be contained in one or more second bytes 34 while one or more third bytes 36 contain the bit sequence number generated at step 104. Finally, one or more bytes 38 containing error correcting code(s) can be included with each data package 30.

Each data package 30 generated at step 106 is next transmitted by gateway 12 (e.g., via hardwire connection, wireless connection, etc.) at step 108 to one of storage devices/facilities 14. The present invention provides for security of the data by distributing all data packages 30 associated with data file 20 amongst (e.g., evenly or approximately evenly) some or all of the plurality of storage devices/facilities 14 that are geographically dispersed over a wide area such that relatively great distances (e.g., miles, kilometers, etc.) separate any two devices/facilities 14. With the original data file 20 stored in this way, a destruction of any one of storage devices/facilities 14 merely "punches a hole" in the data, but does not completely destroy the data. Obviously, the greater the number of different storage devices/facilities 14, the more insignificant the destruction of any one of devices/facilities 14 becomes.

With data package 30 constructed in the above-described fashion, gateway 12 responds to a request for data retrieval in the following fashion. Gateway 12 first verifies that the data retrieval request is authorized. For example, gateway 12 can check the data retrieval request (originating at one of data retrievers 16) for agreement with the permission code maintained at gateway 12. Assuming the data retrieval request is authorized, gateway 12 retrieves all data packages 30 at the various storage devices/facilities 14 containing the matching data retrieval identification in byte(s) 34. Each such data package 30 would be sent back to gateway 12 where the bit sequence number allows the original data file to be reconstructed in its proper order so that the original data file is recovered. The reconstructed data file is then provided to the requesting one of data retrievers 16 as long as the correct permission code has been given.

If a greater level of security is required, the reformatting process can include encryption of the data. For example, the "two key" encryption method described in the above-cited and cross-referenced patent application could be used as will now be described with the aid of FIG. 4. As in the previous embodiment, each data file 20 will have its own unique identification in the form of, for example, a name, a number, a name and number, etc. The identification can be incorporated into data file 20 or can be generated or assigned by gateway 12. Associated with the data identification is a permission code that can be generated/assigned by gateway 12. At a minimum, the permission code is used to verify that a data retrieval is being made by an authorized user. Finally, a data retrieval identification unique to each data file 20 is generated/assigned by gateway 12. Regardless of their origins, gateway 12 associates and archives each data file's data identification, permission code and data retrieval identification at step 200.

Next, on a byte-by-byte basis, each data byte 22 is again assigned a byte number at step 202 based on the sequential position of data byte 22 in data file 20. At step 204, data byte 22 is encrypted to generate an encrypted data byte 22' where encrypted data byte 22' retains the same bit length as data byte 22. The choice of encryption algorithm is not a limitation of the present invention. In general, it is desirable to use an encryption algorithm that can be efficiently decrypted. The encryption/decryption "key" utilized at step 204 can be the same for all data files received by gateway 12, unique for each data file received by gateway 12, or varied in some known or random fashion.

Since encrypted data byte 22' retains the same bit length as data byte 22, each individual bit 24' in encrypted data byte 22' can be assigned a bit sequence number at step 206 based on its unique ordered position in data file 20. For example, if encrypted data byte 22' was based on the fourth data byte (i.e., a sequential byte number of 3) of data file 20, the bit sequence number for the fifth bit from the right of (fourth) encrypted data byte 22' would be (8×3)+5=29. Note that other methods of assigning a bit sequence number could also be used.

Step 208 encrypts the bit sequence number generated at step 206. As with encryption step 204, there are a number of encryption algorithms that could be used. The key feature of the selected algorithm would be reversibility upon decryption such that the original bit sequence number can be recovered. It is preferable that encryption step 208 be accomplished using an encryption/decryption key that is unique to data file 20. For example, the encryption/decryption key for step 208 could be based on or be a function of the above-described data identification, permission code, or data retrieval identification.

Step 210 involves generation of a data "package" 40 for each encrypted data bit 24' that is similar to the above-described data package 30. The first byte 42 of data package 40 contains the value of one encrypted data bit 24' and a destination storage location for bit 24'. The digital "0" or "1" value of encrypted data bit 24' is stored using one or more bits of first byte 42. The remaining bits of first byte 42 contain the destination storage location for first byte 42. Data package 40 also has the previously-described data retrieval identification contained in one or more second bytes 44 while one or more third bytes 46 contain the encrypted bit sequence number generated at step 208. Finally, one or more bytes 48 containing error correcting code(s) can be included with each data package 40. Each data package 40 generated at step 210 is next transmitted (e.g., via hardwire connection, wireless connection, etc.) at step 212 to one of storage devices/facilities 14.

With data package 40 constructed in the above-described fashion, gateway 12 responds to a request for data retrieval in the following fashion. Gateway 12 first verifies that the data retrieval request is authorized. For example, gateway 12 can check the data retrieval request (originating at one of data retrievers 16) for agreement with the permission code maintained at gateway 12. Assuming the data retrieval request is authorized, gateway 12 retrieves all data packages 40 at the various storage devices/facilities 14 containing the matching data retrieval identification in byte(s) 44. Each such data package 40 would be sent back to gateway 12 where the encrypted bit sequence number is decrypted. This allows the original encrypted data file to be reconstructed. After this, decryption of the reconstructed and encrypted data file can proceed with the original data file being recovered. The reconstructed data file is then provided to the requesting one of data retrievers 16 as long as the correct permission code has been given.

The advantages of the present invention are numerous. The system reformats and then stores data in a secure fashion utilizing geographically-dispersed storage devices/facilities, each one of which only stores a small portion of a data file. The break-up and distribution of the data in this fashion assures that any physical theft, cyber theft, or destruction perpetrated on one of the storage devices/facilities will not provide the perpetrator(s) with any meaningful data or permit any meaningful data destruction. The system can be adapted for use with or without encryption/decryption schemes depending on the level of security that is required for a given application.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A data storage system comprising:
   a plurality of data storage devices dispersed over a geographic area wherein any two of said plurality of data storage devices are separated by a distance measured in miles or kilometers;
   a processing system coupled to said plurality of data storage devices, said processing system being adapted to receive data files from a plurality of data sources and to receive requests for said data files from a plurality of data retrievers, said processing system assuring that each of said data files consists of data bytes in a digital format and assigning a data retrieval identification unique to each said data file;

said processing system assigning a unique bit number to each data bit in said data bytes, said bit number identifying a position of said data bit in said data file;

said processing system generating a data package for each said data bit, said data package including a value of said data bit, a bit storage location, said data retrieval identification unique to said data file with which said data bit is associated, and said bit number associated with said data bit, wherein a plurality of data packages are generated for said data file; and said processing system distributing said plurality of data packages approximately evenly amongst said plurality of data storage devices for storage thereat.

2. A data storage system as in claim 1 wherein said processing system encodes each said data package with an error correcting code prior to distribution thereof to one of said plurality of data storage devices.

3. A data storage system as in claim 1 wherein said processing system includes means to convert said data file into said digital format.

4. A data storage system as in claim 1 wherein said bit number identifies an ordered position of said data bit in said data file.

5. A data storage system comprising:

a plurality of data storage devices dispersed over a geographic area wherein any two of said plurality of data storage devices are separated by a distance measured in miles or kilometers;

a processing system coupled to said plurality of data storage devices, said processing system being adapted to receive data files from a plurality of data sources and to receive requests for said data files from a plurality of data retrievers, said processing system assuring that each of said data files consists of data bytes in a digital format and assigning a data retrieval identification unique to each said data file;

said processing system assigning a unique bit number to each data bit in said data bytes, said bit number identifying a position of said data bit in said data file;

said processing system generating a data package for each said data bit, said data package including a first data byte containing (i) a value of said data bit, and (ii) a bit storage location, at least one second data byte containing said data retrieval identification unique to said data file with which said data bit is associated, and at least one third data byte containing said bit number associated with said data bit, wherein a plurality of data packages are generated for said data file; and said processing system distributing said plurality of data packages approximately evenly amongst said plurality of data storage devices for storage thereat.

6. A data storage system as in claim 5 wherein said processing system encodes each said data package with an error correcting code prior to distribution thereof to one of said plurality of data storage devices.

7. A data storage system as in claim 5 wherein said processing system includes means to convert said data file into said digital format.

8. A data storage system as in claim 5 wherein said bit number identifies an ordered position of said data bit in said data file.

9. A data storage system comprising:

a plurality of data storage devices dispersed over a geographic area wherein any two of said plurality of data storage devices are separated by a distance measured in miles or kilometers;

a processing system coupled to said plurality of data storage devices, said processing system being adapted to receive data files from a plurality of data sources and to receive requests for said data files from a plurality of data retrievers, said processing system assuring that each of said data files consists of data bytes in a digital format and assigning a data retrieval identification unique to each said data file;

said processing system encrypting each of said data bytes to generate corresponding encrypted data bytes;

said processing system assigning a unique bit number to each data bit in said encrypted data bytes, said bit number identifying a position of said data bit in said data file;

said processing system encrypting each said bit number to generate a corresponding encrypted bit number associated with each said data bit;

said processing system generating a data package for each said data bit, said data package including a first data byte containing (i) a value of said data bit, and (ii) a bit storage location, at least one second data byte containing said data retrieval identification unique to said data file with which said data bit is associated, and at least one third data byte containing said encrypted bit number associated with said data bit; and said processing system distributing said plurality of data packages approximately evenly amongst said plurality of data storage devices for storage thereat.

10. A data storage system as in claim 9 wherein said processing system encodes each said data package with an error correcting code prior to distribution thereof to one of said plurality of data storage devices.

11. A data storage system as in claim 9 wherein said processing system includes means to convert said data file into said digital format.

12. A data storage system as in claim 9 wherein said bit number identifies an ordered position of said data bit in said data file.

* * * * *